United States Patent
Huang et al.

(10) Patent No.: US 7,496,464 B2
(45) Date of Patent: Feb. 24, 2009

(54) VALIDATION SYSTEM WITH FLOW CONTROL CAPABILITY

(75) Inventors: Chien-Chung Huang, San Jose, CA (US); Yuan-Liang Cheng, San Jose, CA (US); Tung-Hao Huang, Tai-Chung (TW); You-Min Yeh, Chi-Lung (TW); Chung-Yu Chang, Kao-Hsiung (TW)

(73) Assignee: Mediatek USA Inc., San Jose, CA (US)

( * ) Notice: Subject to any disclaimer, the term of this patent is extended or adjusted under 35 U.S.C. 154(b) by 346 days.

(21) Appl. No.: 11/277,040

(22) Filed: Mar. 21, 2006

(65) Prior Publication Data
US 2007/0225826 A1  Sep. 27, 2007

(51) Int. Cl.
*G01R 27/28* (2006.01)
*G06F 19/00* (2006.01)

(52) U.S. Cl. .......................... 702/117; 702/120; 703/20

(58) Field of Classification Search .................... 702/91, 702/108, 117, 119, 120, 123, 185, 193; 703/17, 703/20; 714/38, 715, 742; 717/126; 716/8, 716/18
See application file for complete search history.

(56) References Cited

U.S. PATENT DOCUMENTS

| | | | |
|---|---|---|---|
| 6,678,645 B1 * | 1/2004 | Rajsuman et al. ............. | 703/20 |
| 6,804,620 B1 * | 10/2004 | Larson et al. ................ | 702/91 |
| 7,089,517 B2 * | 8/2006 | Yamoto et al. ................ | 716/5 |
| 2004/0267487 A1 | 12/2004 | Brown | |
| 2005/0166096 A1 * | 7/2005 | Yount et al. .................... | 714/38 |

FOREIGN PATENT DOCUMENTS

CN        1417682 A        5/2003

* cited by examiner

*Primary Examiner*—John H Le
(74) *Attorney, Agent, or Firm*—Winston Hsu

(57) ABSTRACT

A validation system includes: a source agent for storing a plurality of test patterns; a drain agent for performing a validation operation according to a test result; and a device under test (DUT). The device under test includes: a first interface electrically connected to the source agent for communicating with the source agent and receiving the test patterns outputted from the source agent; a target system electrically connected to the first interface for processing the test patterns to generate a plurality of test results; and a second interface electrically connected to the target system and the drain agent for communicating with the drain agent and transferring the plurality of test results to the drain agent.

26 Claims, 1 Drawing Sheet

VALIDATION SYSTEM WITH FLOW CONTROL CAPABILITY

BACKGROUND

The invention relates to a validation system, and more particularly, to a validation system with flow control for validating a target system.

Validation plays a very important role in a design work as design gets bigger and bigger with degree of complexity. Typically, the C model and CAD Tool are conceptual and behavior simulator for a target design which provide basic function validation. However they do have their own limitations when design get too big to keep the simulation time acceptable or one needs to examine the practical function in a real-time manner. For some cases, e.g. a multimedia processor that needs to deal with 30 frames of video per second, using CAD tool to simulate and validate the function of the multimedia processor typically takes a long, long time and hence is hardly a feasible way to be practically used.

In general, the conceptual design starts from the C model. The C model operates in a software environment therefore it relies on execution by a CPU. However, it is also well known that the C model has also lots of limitations, e.g. it is hard to examine the real-time functionality of a target system, to simulate the target system having high-rate input data usually needs a long time that is hardly acceptable for a commercial design schedule.

Another method for validation is to utilize the Field-Programmable-Gate-Array (FPGA) technology. The FPGA is a technology for making integrated circuits. The FPGA is field programmable. This is the key difference that diferentiates it from other conventional chip technologies. Field programmable means that you can re-use chip during design and validation phase whenever you have design change. Using FPGA, it saves tremendous time and money by the way of fast turn-around without highly non-recurring engineering (NRE) cost. At the same time it can provide real-time validation capability.

The invention provide a soltuion which make use of FPGA fast turn-around time, cost saving at the same time provide solution improve FPGA debugging capability in real time application.

SUMMARY

It is therefore one of primary objectives of the claimed invention to provide a validation system capable of controlling data flow, to solve the problems mentioned above.

According to an exemplary embodiment of the claimed invention, a validation system for validating a target system is disclosed. The validation system comprises: a source agent, having a first storage for storing a plurality of test data streams, capable of receiving at least one control command and capable of performing one of the following actions in response to the received at least one control command: outputting one of the test data streams as the selected test data stream, and suspending the outputting of the selected test data stream; a device under test (DUT) comprising a controller and the target system, coupled to the source agent, for processing the selected test data stream output from the source agent to generate an output data stream; and a drain agent coupled to the DUT, receiving the output data stream from the DUT and performing a validation operation based on the output data stream from the DUT and a desired data stream.

According to another exemplary embodiment of the claimed invention, a method for validating a target system is disclosed. The method comprises: providing a source agent having a first storage for storing a plurality of test data streams and being capable of receiving a control command; selecting, at the source agent, one of the test data streams as a selected test data stream when the received control command is a control command $CMD_{SEL}$; outputting, at the source agent, the selected test data stream when the received control command is a control command $CMD_{GO}$; suspending, at the source agent, the outputting of the selected test data stream when the received control command is a control command $CMD_X$; providing a device under test (DUT) comprising a controller and the target system; utilizing the DUT to process the selected test data stream output from the source agent and generate an output data stream; and providing a drain agent for receiving the output data stream from the DUT; utilizing the drain agent to perform a validation operation based on the output data stream from the DUT and a desired data stream.

The present invention validation system control's its own data flow. As a result of this feature, if an error occurs while a simulation is being performed the validation process can be paused immediately. This allows the designer to begin a debugging process for the designed chip.

These and other objectives of the present invention will no doubt become obvious to those of ordinary skill in the art after reading the following detailed description of the preferred embodiment that is illustrated in the various FIGURES and drawings.

DETAILED DESCRIPTION

Figure 1:
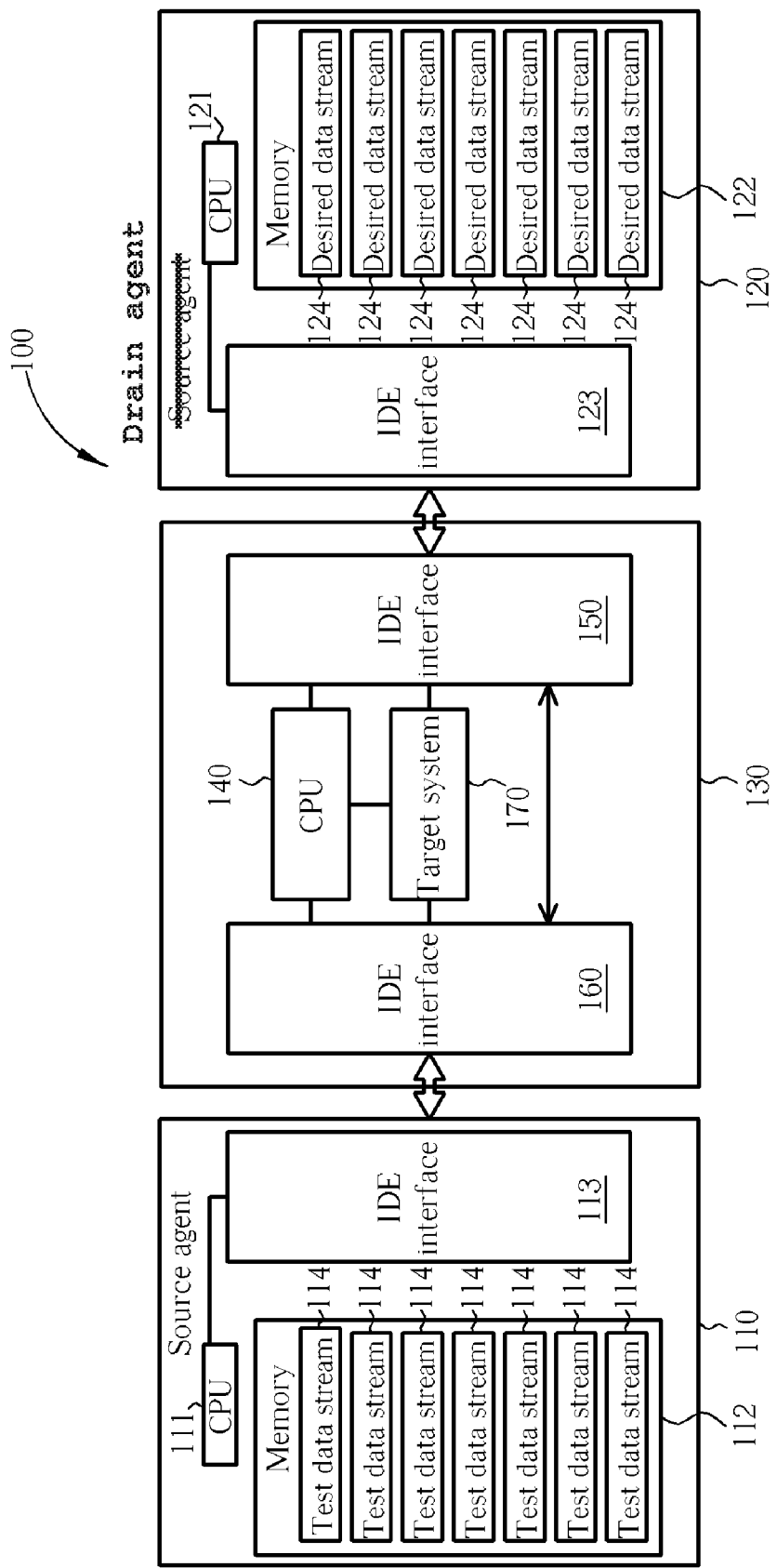
FIG. 1 is a diagram of a validation system according to the present invention.

Please refer to FIG. 1, which is a diagram of a validation system 100 according to the present invention. As shown in FIG. 1, the validation system 100 comprises a source agent 110, a drain agent 120, and a device under test (DUT) 130. The DUT 130 comprises a CPU 140, IDE interfaces 150 and 160, electrically connected to the CPU 140, and a target system 170 electrically connected to the IDE interfaces 150 and 160 and the CPU 140. Please note that the source agent 110 and the drain agent 120 can be implemented by an individual personal computer. In this embodiment, the source agent 110 comprises a CPU 111 and a storage 112, and the drain agent 120 comprises another CPU 121, another storage 122. The storages 112 and 122 could be any type of storage, e.g. memory or hard disk. Therefore, the source agent 110 and the drain agent 120 both benefit from the processing and calculating abilities of the CPUs 111 and 121. Furthermore, the source agent 110 and the drain agent 120 respectively comprise an IDE interface, as an example, 113 and 123 for communicating with the IDE interfaces 160 and 150 in the DUT 130. Lastly, the target system 170 is typically an integrated circuit to be validated. In some cases, the target system 170 can also be implemented by a field programmable gate-array (FPGA).

As shown in FIG. 1, the storage 112 of the source agent 110 stores a plurality of test data streams (or called test patterns) 114, which serves as the input data to be fed to the target system. Furthermore, the storage 122 of the drain agent 120 stores a plurality of desired data streams (or called desired patterns) 124. The desired data streams 124 are respectively the desired results for the output result of the target system to which the corresponding test data stream 114 is fed. The operation of the whole validation system is illustrated as follows.

First, the CPU 140, serving as a controller, sends a control command $CMD_{SEL}$ through the IDE interface 160 and 113 to the source agent 110. The CPU 111 at the source agent 110 receives the control command $CMD_{SEL}$, and then selects one of the test data stream 114 stored in the storage 112. And then, the CPU 111 transfers the selected test data stream 114 to the DUT 130 through the IDE interface 113 and 160. Therefore, the target system 170 receives the selected test data stream 114 and processes the selected test data stream 114 to generate an output data stream.

On the other hand, the CPU 140 also sends another control command through the IDE interface 150 and 123 to inform the drain agent 120 to prepare desired data stream 124 associated with the selected test data stream 114. The output data stream generated by the target system 170 is outputted to the drain agent 120 through the IDE interface 150 and 123. The drain agent 120 validates the functionality of the target system 170 by comparing the content of the output data stream with the associated content of the desired data stream. Note that, the desired data stream for the validation operation can be a predetermined data stream stored in the storage 122 in the drain agent 120, or generated by a calculating module (not shown) in the drain agent 120 in an on-the-fly manner.

The CPU 140 is capable of controlling the data transmission between the source agent 110 and the DUT 130 or the data transmission between the drain agent 120 and the DUT 130. For example, the CPU 140 can send a command to the source agent 110 through the IDE interface 160 and 113 in order to pause the data transmission every N test patterns, where N is some positive integer. The CPU 140 can pause the data transmission every M bits, where M is some positive integer as well. This functionality, of pausing test patterns and data transmissions, provides the designer of the target system 170 with more flexibility in the development and debug.

The CPU 140 has capability of controlling data traffic on the IDE interface 150 and 160. For example, the target system 170 has a problem of handling specific test data stream 114 (this could introduce drain agent 120 mis-match or cause target system 170 hang or mis-function), the target system 170 can trigger, i.e. interrupt, the CPU 140 to send a control command $CMD_X$ to the source agent 110 to suspend the transmission of the selected data stream by way of interrupt CPU 140 when specific condition occurred. Once the problem is resolved, the CPU 140 can send another control command $CMD_{RE}$ to the source agent 110 to resume its data transmission and continuous followings tests.

Furthermore, the drain agent 120 can trigger flow control command to the data transmission of the source agent 110. For some cases, the transfer rate that the source agent 110 delivers data to the DUT 130 could result in fast data streaming for the drain agent 120 to process. Typically, the drain agent 120 has an FIFO (first-in-first-out) buffer (not shown) for receiving/buffering the data output form the DUT 130. When the arrival rate of the input data to the drain agent 120 is too high, the free space of the input FIFO buffer will decrease accordingly. Once the free space of the input FIFO buffer is lower than preset threshold level it inform drain device 120 the data streaming is faster than it can handle. Drain agent will issue a control command $CMD_X$ to the source agent 110 through the IDE interfaces 160, 150, 113, and 123 to inform the source agent 110 to suspend its data transmission. By utilizing this method, the overflow/overload of at the drain agent 120 can be prevented. Drain agent 120 can correctly perform its validation functions without missing any incoming data from the DUT 130. Once the free space of the input FIFO of the drain agent 120 is large enough, say, higher than another threshold, the drain agent 120 can then send another control command $CMD_{RE}$, again through the interfaces 160, 150, 113, and 123 to inform the source agent 110 to resume its data transmission. Furthermore flow control, triggering the source agent 110, the drain agent 120 can control source data speed by the way of CPU 140 as well based on target application specific requirements. Drain agent 120 triggers command through the IDE interfaces 150 and 123 to CPU 140. CPU 140 can be informed either by IDE interface 150 or target system 170 in the DUT 130. Then CPU 140 can issue the control commands to the source agent 110 to suspend or resume its data transmission accordingly.

Another case that needs to suspend the source agent 110 data transmissions is used for data comparison/debugging purpose. The major goal for drain agent 120 is doing data validation in real time. However there is always possible to finds that the output data stream generated by the target system 170 does not comply with the associated desired data stream 124. In such case, it would be necessary to freeze the operation right after the problem is occurred then debug from there. Stop the input stream is the first step to make it happen. Therefore, at this case, the drain agent 120 is capable of issuing the control command $CMD_X$ to halt the operation of the other unit, including the source agent 110.

Validation systems 100 provide solution to cover the weakness of FPGA and development system blind spots. The key for embedded system design is real time debugging. It enabled developer during development and debugging target system with fully control of flow and content in real time.

In addition, the data transmission among the source agent 110, the DUT 130 and the drain agent 120 is flow controlled according to the present invention so that the operation of the whole system is paused at a time instant on a basis of a data unit of the data stream. The present invention provides superior granularity of control: the data transmission in a unit of data (e.g., a certain data stream). As mentioned above, the CPU 140 can be assigned to stop the data transmission every N length of data were transferred, where N is a positive integer. Therefore, the user can directly check a certain length of the data to see where the problem is. For example, the programmer can check the CPU's condition, the target system's condition, or utilize another analyzer to analyze the data, as well as other functions.

Please note, the above-mentioned IDE interfaces 150, 160, 113, and 123 are utilized as a preferred embodiment. The IDE interface 150, 160, 113, and 123 are not limitations of the present invention. In fact, other interfaces, such as the ATA interface, or any other standard, non-standard, or proprietary interface capable of conveying the control command can be also adopted in the present invention. That is, the interfaces mainly serves as a transmission medium, the interface type thereof is not a limitation to the present invention.

In contrast to the related art, the present invention provides an automatic validation system capable of controlling its own data flow. Data flow control is critical when errors occur during a validation process. This allows the present invention to immediately pause the validation process so that the designer can check where the problem is and debug the designed chip. A tremendous amount of time is saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A validation system for validating a target system, comprising:
   a source agent, having a first storage for storing a plurality of test data streams, capable of receiving at least one control command and capable of performing one of the following actions in response to the received at least one control command:
      outputting one of the test data streams as the selected test data stream, and
      suspending the outputting of the selected test data stream;
   a device under test (DUT) comprising a controller and capable of connecting with the target system, coupled to the source agent, for processing the selected test data stream output from the source agent to generate an output data stream; and
   a drain agent coupled to the DUT, receiving the output data stream from the DUT and performing a validation operation based on the output data stream from the DUT and a desired data stream.

2. The validation system of claim 1, wherein the source agent is further capable of performing the following action in response to the received at least one control command:
   resuming outputting the selected test data stream.

3. The validation system of claim 1, wherein the desired data stream for the validation operation is a predetermined data stream stored in a second storage in the drain agent.

4. The validation system of claim 1, wherein the drain agent comprises a calculating module for generating the desired data stream for the validation operation.

5. The validation system of claim 1, wherein the DUT further comprises:
   a controller coupled among the target system, the source agent, and the drain agent and capable of receiving the selected test stream, generating a second test data stream, and feeding the second test stream to the target system,
   wherein the target system generates the output stream according to the second test stream.

6. The validation system of claim 5, wherein the at least one control command is issued by the target system.

7. The validation system of claim 1, wherein the target system generates the output stream according to both the selected test stream from the source agent and the second test stream from the controller.

8. The validation system of claim 1, wherein the at least one control command for suspending is issued by the drain agent.

9. The validation system of claim 8, wherein the at least one control command for suspending is issued by the drain agent when the output data stream does not comply with the desired data stream.

10. The validation system of claim 8, wherein the drain agent further comprises an input buffer for buffering the received output data stream from the DUT, the at least one control command is issued by the drain agent when the free space of the input buffer is lower than a threshold.

11. The validation system of claim 1, wherein the at least one control command is issued by the DUT.

12. The validation system of claim 1, wherein the target device is implemented by a field programmable gate-array (FPGA).

13. The validation system of claim 1, wherein the target device is an integrated circuit.

14. A method for validating a target system comprising:
   providing a source agent having a first storage for storing a plurality of test data streams and being capable of receiving a control command;
   selecting, at the source agent, one of the test data streams as a selected test data stream when the received control command is a control command CMDSEL;
   outputting, at the source agent, the selected test data stream when the received control command is a control command CMDGO;
   suspending, at the source agent, the outputting of the selected test data stream when the received control command is a control command CMDX;
   providing a device under test (DUT) comprising a controller and the target system;
   utilizing the DUT to process the selected test data stream output from the source agent and generate an output data stream; and
   providing a drain agent for receiving the output data stream from the DUT;
   utilizing the drain agent to perform a validation operation based on the output data stream from the DUT and a desired data stream; and
   providing a drain agent having a second storage for storing a plurality of desired data streams and selecting one of the desired data streams as the selected desired data stream according to the first control command.

15. The method of claim 14, wherein the desired data stream is a predetermined data stream associated with the selected test data stream.

16. The method of claim 14, wherein the desired data stream for the validation operation is generated by a calculating module in the drain agent.

17. The method of claim 14, wherein the source agent comprise a first interface, the drain agent comprises a second interface, and the DUT comprises a third interface for connecting to the first interface and a fourth interface for connecting to the second interface.

18. The method of claim 14, further comprising:
   resuming outputting the selected test data stream when the second control command is a control command $CMD_{RE}$.

19. The method of claim 18, wherein the control command CMDX is issued by the drain agent.

20. The method of claim 19, wherein the drain agent issues a control command CMDX to the source agent when the output data stream does not comply with the desired data stream.

21. The method of claim 19, wherein the drain agent further comprises an input buffer for buffering the received output data stream from the DUT and the drain agent issues a control command $CMD_X$ to the source agent when the free space of the input buffer of the drain agent is lower than a threshold.

22. The method of claim 18, wherein the control command CMDX is issued by the target system.

23. The method of claim 18, wherein the control command CMDX is issued by the controller when the controller receives a third control command.

24. The method of claim 14, wherein the first control command is issued by the controller.

25. The method of claim 14, wherein the target system is an integrated circuit.

26. The method of claim 14, further comprising:
   utilizing a field programmable gate-array (FPGA) to implement the target system.

* * * * *